US 8,091,141 B2

(12) United States Patent
Evans et al.

(10) Patent No.: US 8,091,141 B2
(45) Date of Patent: Jan. 3, 2012

(54) PARENTAL CONTROLS FOR ENTERTAINMENT CONTENT

(75) Inventors: C. Shane Evans, Duvall, WA (US); Kareem A Choudhry, Redmond, WA (US); Roderick M. Toll, Sammamish, WA (US); Jonathan D. Hildebrandt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/341,895

(22) Filed: Dec. 22, 2008

(65) Prior Publication Data

US 2009/0113519 A1   Apr. 30, 2009

Related U.S. Application Data

(62) Division of application No. 10/683,856, filed on Oct. 10, 2003, now Pat. No. 7,472,424.

(51) Int. Cl.
*H04N 7/16*   (2011.01)

(52) U.S. Cl. .................. 726/27; 726/2; 726/26; 725/25; 725/28; 705/50; 705/51

(58) Field of Classification Search .......... 726/2, 26–27; 725/25, 28; 705/50–51
See application file for complete search history.

(56) References Cited

U.S. PATENT DOCUMENTS

| | | | | |
|---|---|---|---|---|
| 5,589,945 | A | * | 12/1996 | Abecassis ........................ 386/83 |
| 5,717,814 | A | * | 2/1998 | Abecassis ....................... 386/299 |
| 5,809,230 | A | | 9/1998 | Pereira |
| 5,881,225 | A | | 3/1999 | Worth |
| 5,973,683 | A | * | 10/1999 | Cragun et al. ................. 715/719 |
| 6,118,744 | A | | 9/2000 | Sturgeon |
| 6,216,228 | B1 | | 4/2001 | Chapman |
| 6,938,005 | B2 | | 8/2005 | Iverson |
| 2002/0128061 | A1 | | 9/2002 | Blanco |
| 2002/0147782 | A1 | | 10/2002 | Dimitrova |
| 2003/0005135 | A1 | * | 1/2003 | Inoue et al. .................... 709/229 |
| 2003/0115592 | A1 | | 6/2003 | Johnson |
| 2003/0124973 | A1 | * | 7/2003 | Sie et al. ....................... 455/2.01 |
| 2003/0126267 | A1 | * | 7/2003 | Gutta et al. .................... 709/229 |
| 2003/0233651 | A1 | * | 12/2003 | Farley et al. ..................... 725/37 |
| 2004/0123135 | A1 | * | 6/2004 | Goddard ........................ 713/200 |
| 2004/0261099 | A1 | * | 12/2004 | Durden et al. .................. 725/32 |

OTHER PUBLICATIONS

Sile Yu et al., "An Improved Structure of Pre-Determined Parental Viewing Control Data in Software Design for ATSC Receiver", IEEE Transactions on Consumer Electronics, Feb. 2002, pp. 131-134.
Leonard A. Jason et al., "Reducing Children's Television Viewing with an Inexpensive Lock", Child & Family Behavior Therapy, vol. 15(3), 1993, pp. 45-54.
U.S. Appl. No. 10/683,856, mail date May 3, 2007, Office Action.

(Continued)

*Primary Examiner* — Yin-Chen Shaw
(74) *Attorney, Agent, or Firm* — Workman Nydegger

(57) ABSTRACT

Parental controls for entertainment digital media are provided that allow a parent to restrict multiple user's access to entertainment content. One or more updatable rating definition files with dynamic data are used to define rating levels and content descriptors for a regional rating system. Entertainment content definition files define the rating level and content descriptors for entertainment content. User permission settings define a particular user's access rating level and content descriptors. The rating definition file can be used to compare the entertainment content definition file and user permission settings in determining if a user is allowed access to particular entertainment content.

20 Claims, 5 Drawing Sheets

OTHER PUBLICATIONS

U.S. Appl. No. 10/683,856, mail date Oct. 19, 2007, Office Action.
U.S. Appl. No. 10/683,856, mail date Mar. 20, 2008, Office Action.
U.S. Appl. No. 10/683,856, mail date Oct. 7, 2008, Notice of Allowance.

* cited by examiner

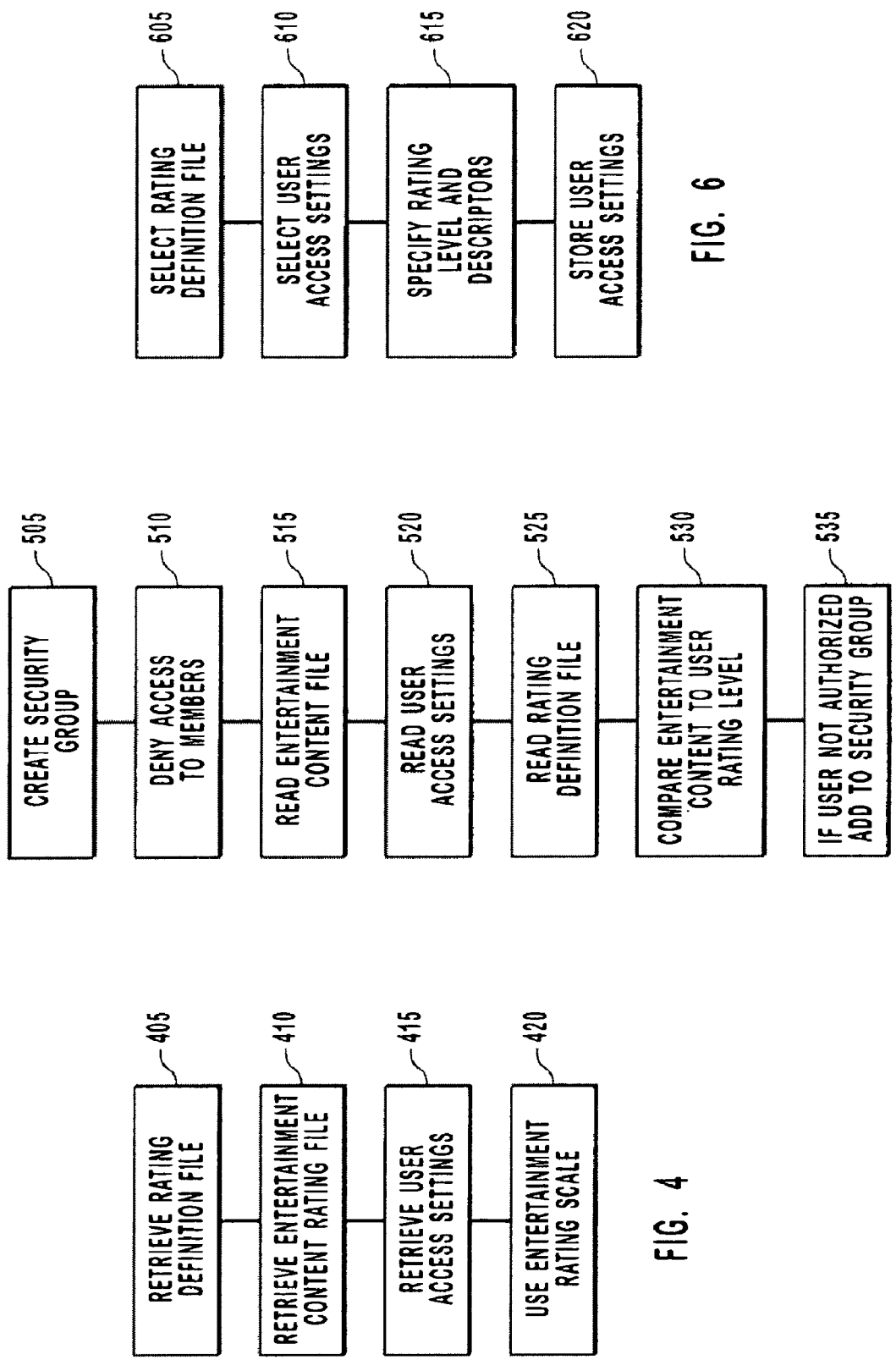

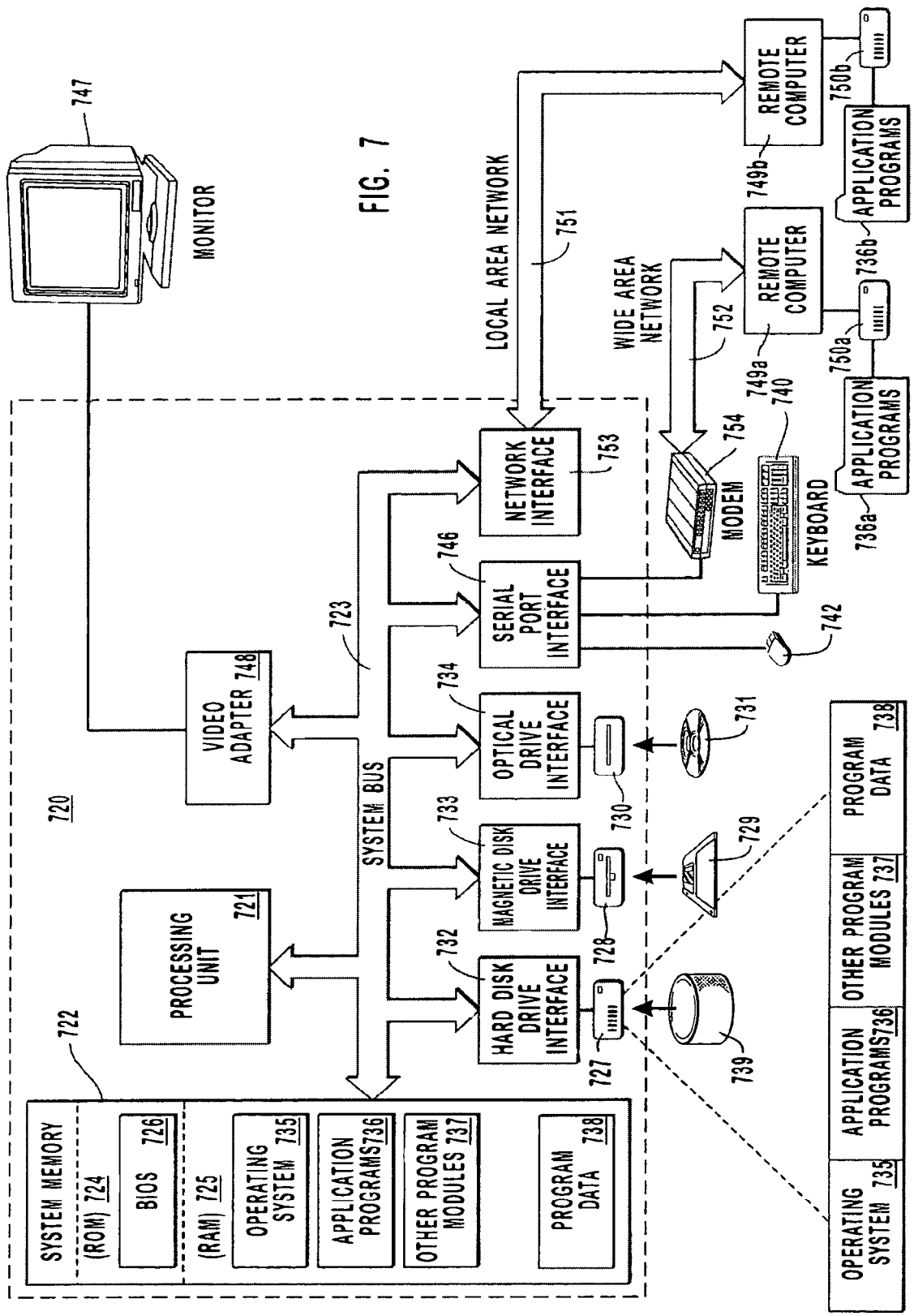

PARENTAL CONTROLS FOR ENTERTAINMENT CONTENT

CROSS-REFERENCE TO RELATED APPLICATIONS

This application is a divisional of, and claims priority to and the benefit of, U.S. patent application Ser. No. 10/683,856, entitled "PARENTAL CONTROLS FOR ENTERTAINMENT CONTENT," which was filed Oct. 10, 2003, which is expressly incorporated herein by this reference.

BACKGROUND OF THE INVENTION

1. The Field of the Invention

The present invention generally relates to parental controls for entertainment digital media in the arts of music, video and games. More particularly, the present invention provides for an extensible and flexible way of controlling a user's access to entertainment content using dynamic data defined by a rating definition file, entertainment content definition file and user permission settings.

2. Background and Relevant Art

Rating systems for entertainment media have existed in one form or another for several decades. Probably the most common known rating system in the United States is the movie rating system defined by the Classification and Rating Administration (CARA), a division of the Motion Picture Association of America (MPAA). The rating system was established in the late 1960's and was the only entertainment rating system for any media for almost two decades. Growing concern over explicit content in other areas of the entertainment industry urged the music and interactive software industries to adopt rating guidelines of their own. Accordingly, in 1985 the Recording Industry Association of America (RIAA) established Parental Advisory Program guidelines that identified music releases that contained explicit lyrics, including explicit descriptions of violence and sex. Following suit in 1994, the Entertainment Software Association (ESA), formally the Interactive Digital Software Association (IDSA), established the Entertainment Software Rating Board (ESRB) that independently applies and enforces ratings, advertising guidelines, and on-line privacy principles adopted by the industry.

Although the entertainment industries have done a lot to identify explicit content within the various media sold so that parents can make intelligent entertainment content choices for their children, there is still much to be done in the enforcement area for these industries. For example, because the various rating systems are only established as guidelines by the individual industries, compliance with these guidelines is voluntary. Accordingly, retailers receive little if any penalties for selling explicit materials containing mature content to minors. Further, there are some that feel enforcement of these guidelines on point-of-sale retailers forces the parenting responsibilities onto the retailers. Nevertheless, many manufacturers and retailers of entertainment content have established policies within the individual companies to adhere to the guidelines set out by the various entertainment industries.

Regardless of the compliance or non-compliance by point-of-sale retailers, the fact remains that children often obtain entertainment content that their parents do not approve of. Pressure is mounting within the everyday public for stronger protections to be provided to the children of concerned parents. Accordingly, manufacturers of the players for entertainment content have established parental controls that allow parents to more effectively supervise the entertainment content their children can play. For example, most DVD players and game consoles currently have some form of parental control that allows a parent to set a maximum entertainment content rating. Therefore, unless an override code is entered, the content played is restricted to ratings that are equal to or below the parental control rating. Further, cable and dish boxes, along with Internet software, provide a way to limit the movie content and website content that a minor can view. In addition, some gaming consoles support rating systems from various regions throughout the world.

Although the above-described and other parental control systems have advanced enforcing rating guidelines for the various entertainment media, there still exist several deficiencies and drawbacks of current systems. For example, there is currently no system that supports parental controls for multiple users. Accordingly, a parent having several children in various age groups cannot set parental controls separately for each child. Further, these systems only support age based rating enforcement, and provided no further limitations based on content descriptors. Moreover, rating systems evolve over time. Although changes are infrequent, content descriptors come and go, and top-level ratings are sometimes added or deleted. Because the above-identified parental control systems are coded, rather than data-driven, they are not expandable and updatable. In addition, there are no per-game exceptions to the age-based systems, and therefore a parent does not have the flexibility in specifically choosing entertainment content that a child can or cannot play.

For at least those reasons stated above, there exists a need for methods, systems and computer program products that provide parental controls that provide multiple users access to entertainment content using dynamic data for expanding and updating the system. Further, there exists a need for an age-based parental control system that is further limited by descriptors and per-game exceptions.

BRIEF SUMMARY OF THE INVENTION

In accordance with exemplary embodiments of the present invention, the above-identified drawbacks and deficiencies of current parental control systems are overcome. Example embodiments provide for an entertainment system and method for playing entertainment content that controls a user's access to the entertainment content using dynamic data defined by rating definition file, entertainment content definition file and user permission settings. The entertainment system and method retrieve a rating definition file that dynamically defines an entertainment rating scale. Further, the system and method retrieve both an entertainment content definition file that defines a content rating for entertainment content and user access settings that define a user's access rating for a particular user. Using the entertainment rating scale dynamically defined by the rating definition file, the system and method compare the user access rating with the content rating for the entertainment content to determine if the particular user is allowed access to the entertainment content.

In accordance with another example embodiment, a entertainment system and method are provided that control a user's access to entertainment content by creating a security group for the entertainment content and denying access to the entertainment content for members of the security group. The system and method provide for reading an entertainment content definition file that defines a rating level and one or more content descriptors for the entertainment. User access settings for a particular user are read that define a rating level and one or more content descriptions for the user. Further, an updatable rating definition file is read that defines a rating hierarchy and content descriptors for the one or more levels within the rating hierarchy. Based on the hierarchy defined in the rating definition file, instructions are executed that compare the rating level and content descriptors for the entertainment content to the rating level and content descriptors for the user in determining if the user is authorized access to the entertainment content. If the user is not authorized to access the entertainment content the particular user is added as a member of the security group, thereby denying the user access to the entertainment content because members of the security group are denied access.

In accordance with yet another example embodiment, a system and method for controlling a user's access to entertainment content is provided that selects a rating definition file and user access settings for particular user. The selected rating definition file defines a rating hierarchy and content descriptors for one or more levels within the rating hierarchy for an entertainment content definition file and user access settings. Within the user access settings, a rating level and one or more content descriptors are specified based on the selected rating definition file in order to control content that can be accessed by the user. The user access settings are stored and are to be used when comparing with an entertainment content rating in determining if a user has access to selected content.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates steps for controlling a user's access to entertainment content during install and run time in accordance with example embodiments;

FIG. 5 illustrates acts of controlling a user access to entertainment content during install and run time in accordance with example embodiments;

FIG. 6 illustrates acts of the setup process for controlling a user's access to entertainment content in accordance with example embodiments; and FIG. 7 illustrates an example system that provides a suitable operation environment for the present invention.

DETAILED DESCRIPTION OF THE PREFERRED EMBODIMENTS

The present invention extends to methods, systems, and computer program products for controlling a user's access to entertainment content using dynamic data defined by rating definition file, entertainment content definition file and user permission settings. The embodiments of the present invention may comprise a special purpose or general-purpose computer including various computer hardware, as discussed in greater detail below.

Figure 1:
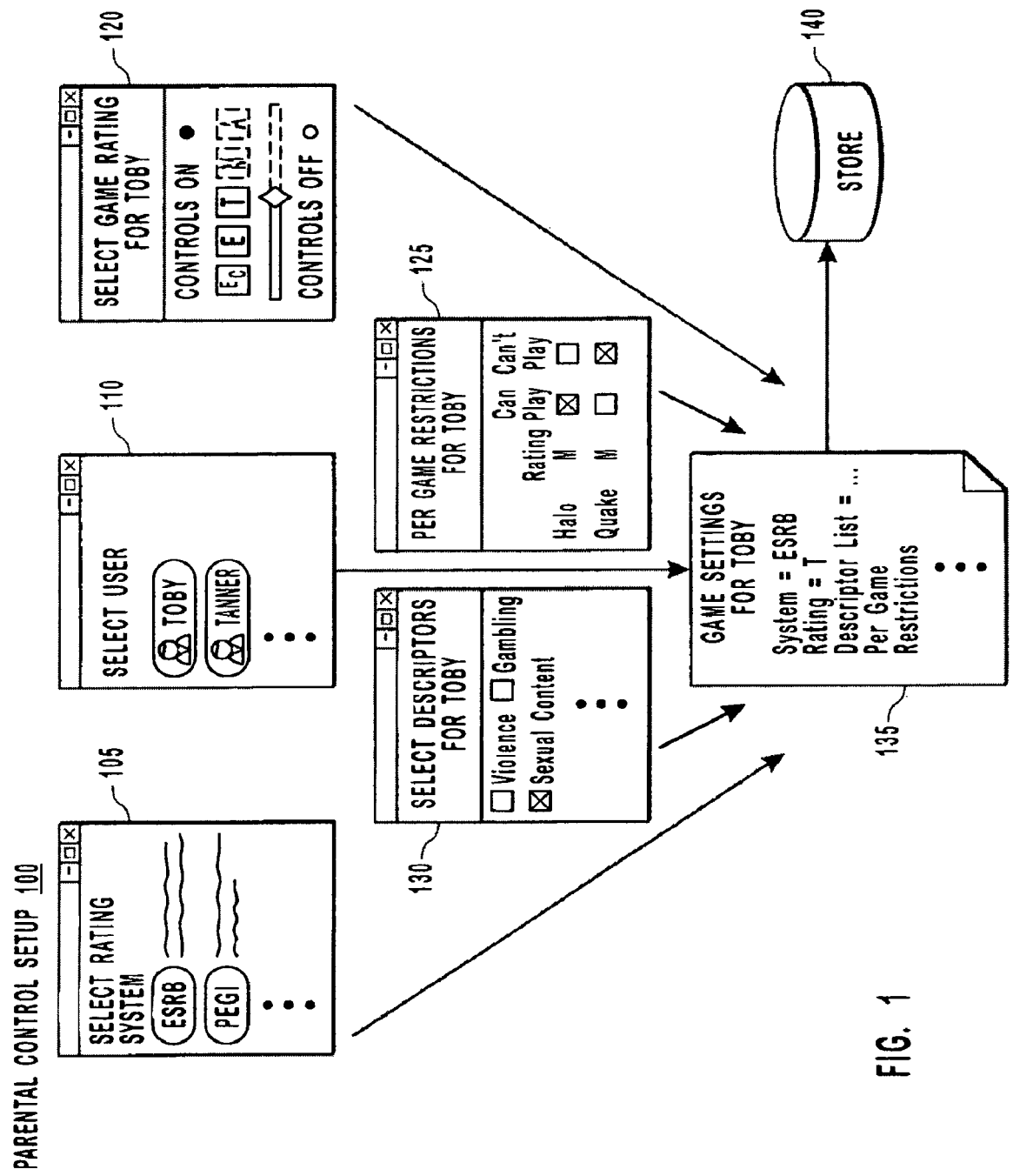
FIG. 1 illustrates an example embodiment of creating user permission settings using a parental controls setup user interface.

Example embodiments provide for methods, systems and computer program products for overcoming the deficiencies of other parental control systems. Although the following examples will generally be described in the context of an interactive entertainment system (i.e., games), the present invention may also be applicable to other forms of digital entertainment content such as movie DVDs and music CDs. As such, the examples described herein for parental controls in a gaming environment are used for illustrative purposes only and are not meant to limit the scope of the present invention. Example embodiments of the present invention provide for a parental control user interface (UI) that allows a parent to setup entertainment content restrictions and/or permissions for multiple users. FIG. 1 illustrates an example of a parental control setup 100, which includes various screens that a parent can access in order to create user permission settings for a limited user, which can then be stored. Parents may be assumed to be system administrators, and can access the user interface by simply selecting something like "Limit Which Games Can Be Played" activity within a parental controls item, and then selecting the user account to which they want to apply changes. For example, when a parent as a system administrator accesses the parental control setup they may first see a screen 105 prompting them to select the rating system to be used. This screen 105 provides the parent with the simple view of the rating systems available in their, or other, geographical regions (e.g. ESRB, PEGI, etc.). As a default, the rating system may be automatically chosen for the administrator based on the region set in the administrator's account, and can be changed or selected by the administrator within the parental controls UI from the control panel.

The parent may then be prompted from screen 110 to select a user to apply the rating restrictions in the gaming system. Example embodiments provide that different rating selections can apply to different users, thereby allowing great flexibility in the system. In particular, a parent having children of various ages can individually control the type of entertainment content that each of the users or children may play.

Based on the selected rating system, the parent may then be prompted to select a game rating for the user selected in screen 120. Within this screen 120, the parent can easily set the maximum level of access for the child by way of a standard control, such as a slider. Settings can be applied to the selected child account when the parent chooses the user interface by clicking "OK". As will be discussed in greater detail below, once set the child is added to the appropriate security groups to limit the access to certain entertainment content.

Other example embodiments provide for a dynamic visual feedback that provides a brief explanation of the currently selected rating. For example, as a mother ("Abby") scrolls through various ratings in the ESRB system, when the slider is on the various rating a small pop-up screen may appear to describe what each rating system means (e.g. with the slider on Ec, a pop up screen may appear with the quote "content may be suitable for ages 3 and older," etc.).

Screen 120, or another screen, may also have a parental control on/off that allows the parent to choose whether or not parental controls will be used. Example embodiments provide for a default of parental controls on. Alternatively, of course, the default could be parental controls off.

In yet another example embodiment, a parent may access the advance setting dialog from a main rating configurations screen, which will bring up screen 130 for selecting descriptors for a user. This screen 130 may allow the parent to select a default behavior for unrated games, as well as choose filtering based on content descriptors specified within individual entertainment content definition files (ECDF), described below. The later feature allows parents to meter access to games at a finer level of detail than just ratings. For instance, Abby (Toby's mother) may allow Toby access to games with a Mature ("M") rating; however, she may wish to selectively filter Toby's access to these games based on content descriptors such as blood and gore, sexual content, alcohol reference, drug reference, nudity, suggestive themes, etc. A list of current content descriptors and their meanings, as defined by the ESRB rating system, is shown below in Table 1.

TABLE 1

Current Content Descriptors for the ESRB Rating System

Alcohol Reference - Reference to and/or images of alcoholic beverages
Animated Blood - Cartoon or pixilated depictions of blood
Blood - Depictions of blood
Blood and Gore - Depictions of blood or the mutilation of body parts
Cartoon Violence - Violent actions involving cartoon-like characters. May include violence where a character is unharmed after the action has been inflicted
Comic Mischief - Scenes depicting slapstick or gross vulgar humor
Crude Humor - Moderately vulgar antics, including bathroom humor
Drug Reference - Reference to and/or images of illegal drugs
Edutainment - Content of product provides user with specific skills development or reinforcement learning within an entertainment setting. Skill development is an integral part of product
Fantasy Violence - Violent actions of a fantasy nature, involving human or non-human characters in situations easily distinguishable from real life
Gambling - Betting like behavior
Informational - Overall content of product contains data, facts, resource information, reference materials or instructional text
Intense Violence - Graphic and realistic-looking depictions of physical conflict. May involve extreme and/or realistic blood, gore, weapons, and depictions of human injury and death
Mature Humor - Vulgar and/or crude jokes and antics including "bathroom" humor
Mature Sexual Themes - Provocative material, possibly including partial nudity
Mild Language - Mild references to profanity, sexuality, violence, alcohol, or drug use
Mild Lyrics - Mild references to profanity, sexuality, violence, alcohol, or drug use in music
Mild Violence - Mild scenes depicting characters in unsafe and/or violent situations
Nudity - Graphic or prolonged depictions of nudity
Partial Nudity - Brief and mild depictions of nudity
Sexual Violence - Depictions of rape or other sexual acts
Some Adult Assistance May Be Needed - Early Childhood Descriptor only
Strong Language - Profanity and explicit references to sexuality, violence, alcohol, or drug use
Strong Lyrics - Profanity and explicit references to sex, violence, alcohol, or drug use in music
Strong Sexual Content - Graphic depiction of sexual behavior, possibly including nudity
Suggestive Themes - Mild provocative references or materials
Tobacco Reference - Reference to and/or images of tobacco products
Use of Drugs - The consumption or use of illegal drugs TABLE 1-continued Current Content Descriptors for the ESRB Rating System Use of Alcohol - The consumption of alcoholic beverages
Use of Tobacco - The consumption of tobacco products
Violence - Scenes involving aggressive conflict A mark in the check box for the content descriptors may indicate that those games with matching content descriptors should be excluded from the user's access. In other words, those content descriptors selected cannot be played by Toby. For example, as shown in screen 130, if "Sexual Content" is checked then Toby will be unable to play any games that contain this descriptor. Alternatively, a mark in the check box may indicate that those games with matching content descriptors should be included in the user's access.

It is not necessary that every available content descriptor for a rating system apply to each level of the age-based hierarchy, i.e., the content descriptors may be specific to the various levels within the age-based ratings. For example, because an ESRB rating of $E_C$ indicates that parents would not find the content inappropriate (i.e., the content is suitable for children ages 3 and older), it is unlikely this age-based rating level would contain "Blood and Gore," "Sexual Content," "Drug Reference," etc. Accordingly, these descriptors may not apply to the age-based rating of $E_C$.

Of course, alternative embodiments allow the content descriptors to be independent of the age-based rating, i.e., every content descriptor for a rating system applies to each level within the age-based rating hierarchy. For instance, every content descriptor shown in Table 1 can apply to each rating level of Early childhood ("$E_C$"), Everyone (E), Teen ("T"), Mature ("M") and Adult ("A") within the ESRB system.

With regard to the advanced setting for default behavior of unrated games, a parent may choose to allow or disallow access to unrated games. Other example embodiments provide that if a title has a rating of "Rating Pending" it may be treated as an unrated content. Further, another example embodiment provides that any title that has a rating from an unknown rating system will be treated as unrated content. Moreover, example embodiments provide that any title that lacks a signed ECDF is deemed unrated and treated with the users preferred behavior for unrated games. In addition, example embodiments also provide for a default setting for unrated games, e.g. allow access but log, disallow access, etc.

While ratings-based restrictions with content descriptors allow parents a greater granularity in controlling their children's access to games, parents can further refine access by making exceptions to individual games using the per-game restrictions screen 125. This feature allows parents to use basic ratings most of the time, and to make personal exceptions to those games with higher or lower ratings (to allow or disallow) on a per-game basis. Example embodiments provide that when a parent changes ratings-based settings, they are notified of conflicts for the selected game ratings and content descriptors chosen by the parent. The per-game restrictions screen 125 provides for a list of all games, with simple user interface to enable or disable access to that game for the user whose access is currently being configured. This may be for example, a scrollable list of games with accompanying check boxes. Similar to the check boxes for content descriptors, a mark in the check box may mean either that the game should be included or excluded from a user's access.

Once the parent has gone through the various screens for setting up the parental controls for a particular user, all the information can be saved as user permissions settings 135 and subsequently stored in store 140. User permission settings can be created for each of the users for which parental controls apply.

In accordance with an example implementation, access control entries (ACEs) are created at install-time (and at runtime in the case of legacy games, as described below) requiring a game installer to notify the system of the games presence and allow the system to configure access during the installation process. During the install, parental controls will create a security group for the game and apply a full access deny ACE to the game directory. This full access deny ACE will be inherited by the children folders and files of the directory. The owner of the directory will then be changed to the administrators group to prevent a limited user account from removing the ACE. Every user with parental control settings will then be evaluated against the ratings of this new game. If they are blocked from playing it, they will be added to the security group. Any members of this group will then be unable to access the game or any directories associated with this game. Accordingly, the lockdown of the directories prevents an unauthorized user from accessing any art, executables or other content associated with the game. When a game is uninstalled, the deny ACE may be removed from the directory, the members of the security group may also be removed and the group can then be deleted.

Figure 2:
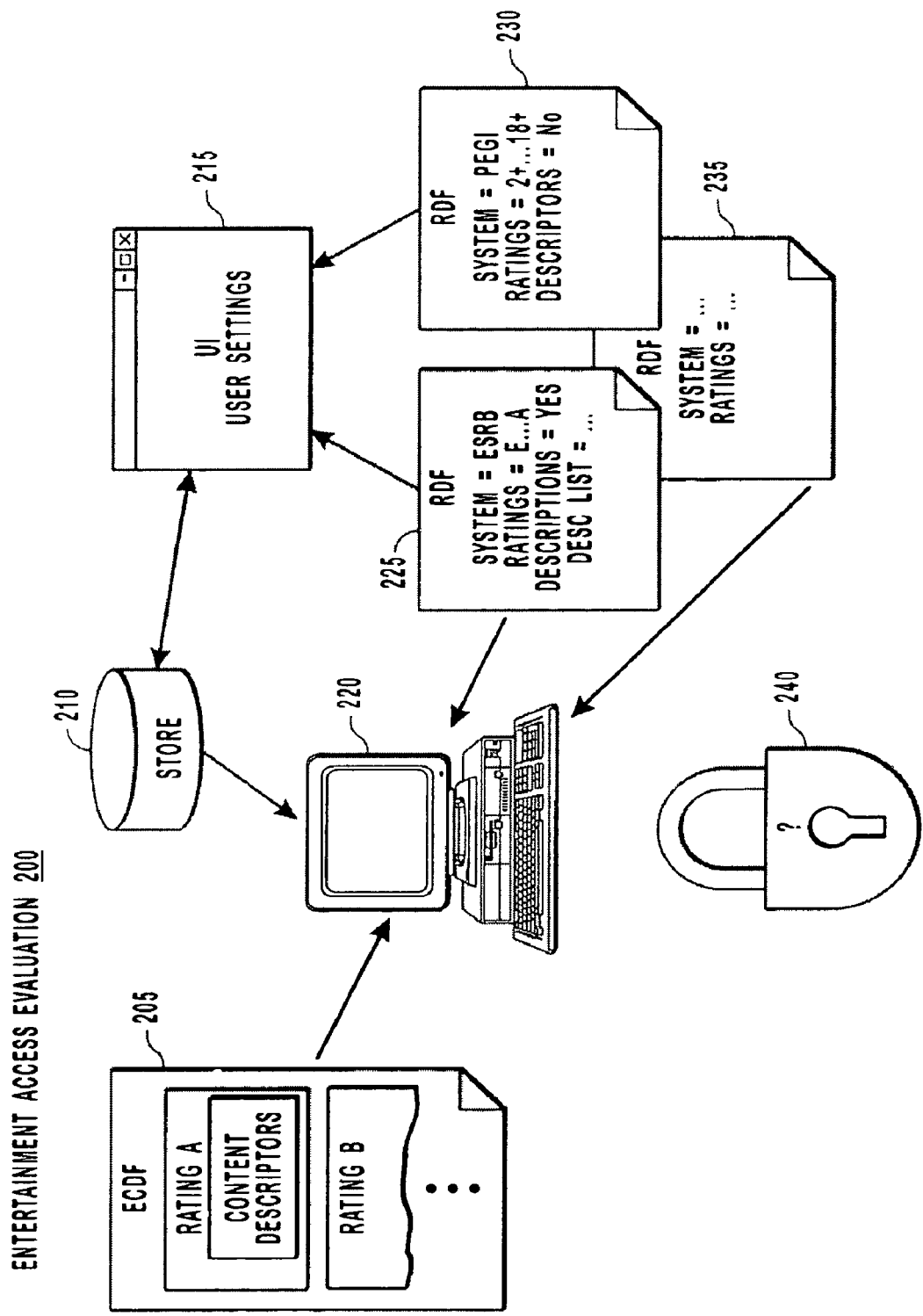
FIG. 2 illustrates an example embodiment of how entertainment content can be controlled and dynamically updated.

FIG. 2 illustrates an example embodiment of entertainment access evaluation 200. Each game installed or run in the present system has associated with it an entertainment content definition file (ECDF). ECDF files will specify any number of different rating levels for various rating systems and the corresponding content descriptors associate with that entertainment content. Example embodiments provide for an application program interface (API) 220 that will open the ECDF file and obtain the rating. If the ECDF is not properly signed, example embodiments provide that the API may return false if the user is not permitted to play unrated content. Further, example embodiments provide that the API 220 will be called during start up of the game and during start up for the installation of the game.

The user permission settings, which as previously described were created using UI 215 and stored in store 210, are also retrieved by API 220 to compare with the ECDF file 205 in evaluating whether a particular user can gain access to the specific entertainment content being installed or ran. The user settings and ECDF file are evaluated based on a rating definition file (RDF) for a particular rating system. For example, a rating definition file (RDF) 225 is a system file with dynamic data that defines various ratings and descriptors for the ESRB system.

Example embodiments provide for multiple RDF files for each rating system within a particular geographical region. Accordingly, there may be an RDF file 225 for the ESRB system, an RDF file 230 for the Pan-European Game Institute (PEGI), or RDF files for other known rating system for a particular region. Further, the system is extensible in that RDF files for unknown rating systems can be added, for example RDF file 235.

The present invention also allows for emergent and/or evolving rating systems (i.e., rating systems that are later created and/or change over time), which can be added through system updates facilitated by dynamic data-driven RDF files. Content descriptors come and go, top-level ratings are sometimes added or deleted, and rating systems may later be created throughout the world as rating systems grow in popularity. Accordingly, because the present invention defines the RDF files using data rather than hard-coded logic, the content descriptors and rating levels within these files are capable of being updated. Updates may occur, e.g. through operating system service packs. After update, access permission to games may immediately conform to the new associated translations.

Example embodiments also provide that if a game with a deprecated rating is already installed when a new rating definition is installed, the system retains the access rights for all users currently on the system using per-game configuration. For instance, assume that a user "Toby" has access to games of the ESRB rating T, but a user's "Tanner's" setting is E. If the ESRB T rating is deprecated, access to the game may be allowed from Toby's account, but disallowed from Tanner's. These settings may be properly reflected in the per-game settings UI. Other example embodiments provide that games with a deprecated rating installed after new rating definition file is upgraded may be assumed to be unrated. Install-time API 220 returns success or failure code based on the behavior chosen by the parent for unrated games. Game restrictions may later be configured via per-game settings.

Example embodiments also provide that the RDF may specify, for a given rating system, which locales will have it as the default. This may of course be changed by the administrator.

Example embodiments further provide that the RDF file may be in the form of an extensible mark-up language (XML) file with the necessary information and a graphics dll. Table 2 illustrates an example implementation of an RDF file for the ESRB system in accordance with the present invention.

TABLE 2

Example RDF File

```
xml version="1.0" encoding="utf-8" ?>
RatingsDefinitionFile>
    <RatingSystem>
        <RatingID>{768BD93D-63BE-46A9-8994-0B53C4B5248F}</RatingID>
        <Version>1.0.0.0000</Version>
        <DefaultLocales>
            <LocaleID>en</LocaleID>
        </DefaultLocales>
        <Locales>
            <Locale>
                <LocaleID>en</LocaleID>
                <SystemName>ESRB</SystemName>
                <SystemDescription>   Entertainment Software Ratings
                                  Board</SystemDescription>
                <SystemWebAddress>http://www.esrb.com</SystemWebAddress>
                <LogoGraphicID>ESRB_logo.gif</LogoGraphicID>
                <Ratings>
```

TABLE 2-continued

Example RDF File

```
    <rating>
        <level>0</level>
        <RatingName>Ao</RatingName>
        <RatingDescription>    Ao-rated (Adults only - suitable only for
                                adults)</RatingDescription>
        <GraphicID>ESRB_Ao.gif</GraphicID>
    </rating>
    <rating>
        <level>1</level>
        <RatingName>M</RatingName>
        <RatingDescription>    M-rated (Mature - suitable for ages 17 and
                                older)</RatingDescription>
        <GraphicID>ESRB_M.gif</GraphicID>
    </rating>
    <rating>
        <level>2</level>
        <RatingName>T</RatingName>
        <RatingDescription>    T-rated (Teen - suitable for ages 13 and
                                older)</RatingDescription>
        <GraphicID>ESRB_T.gif</GraphicID>
    </rating>
    <rating>
        <level>3</level>
        <RatingName>E</RatingName>
        <RatingDescription>    E-rated (Everyone - suitable for ages 6 and
                                older)</RatingDescription>
        <GraphicID>ESRB_E.gif</GraphicID>
    </rating>
    <rating>
        <level>4</level>
        <RatingName>Ec</RatingName>
        <RatingDescription>    Ec-rated (Early Childhood - suitable for ages 3
                                and older)</RatingDescription>
        <GraphicID>ESRB_Ec.gif</GraphicID>
    </rating>
</Ratings>
<Descriptors>
    <Descriptor>
        <ID>0</ID>
        <Name>Alcohol Reference</Name>
        <Description>-     Reference to and/or images of alcoholic
                            beverages</Description>
    </Descriptor>
    <Descriptor>
        <ID>1</ID>
        <Name>Animated Blood</Name>
        <Description>-     Cartoon or pixilated depictions of
                            blood</Description>
    </Descriptor>
    <Descriptor>
        <ID>2</ID>
        <Name>Blood</Name>
        <Description>-     Depictions of blood</Description>
    </Descriptor>
    <Descriptor>
        <ID>3</ID>
        <Name>Blood and Gore</Name>
        <Description>-     Depictions of blood or the mutilation of body
                            parts</Description>
    </Descriptor>
    <Descriptor>
        <ID>4</ID>
        <Name>Comic Mischief</Name>
        <Description>-     Scenes depicting slapstick or gross vulgar
                            humor</Description>
    </Descriptor>
    <Descriptor>
        <ID>5</ID>
        <Name>Drug Reference</Name>
        <Description>-     Reference to and/or images of illegal
                            drugs</Description>
    </Descriptor>
    <Descriptor>
        <ID>6</ID>
        <Name>Edutainment</Name>
        <Description>-     Content of product provides user with specific skills
                            development or reinforcement learning within an
                            entertainment setting. Skill development is an
```

TABLE 2-continued

Example RDF File

```
                        integral part of product</Description>
</Descriptor>
<Descriptor>
    <ID>7</ID>
    <Name>Gambling</Name>
    <Description>-        Betting like behavior</Description>
</Descriptor>
<Descriptor>
    <ID>8</ID>
    <Name>Informational</Name>
    <Description>-        Overall content of product contains data, facts,
                        resource information, reference materials or
                        instructional text</Description>
</Descriptor>
<Descriptor>
    <ID>9</ID>
    <Name>Mature Humor</Name>
    <Description>-        Vulgar and/or crude jokes and antics including
                        bathroom humor</Description>
</Descriptor>
<Descriptor>
    <ID>10</ID>
    <Name>Mature Sexual Themes</Name>
    <Description>-        Provocative material, possibly including partial
                        nudity</Description>
</Descriptor>
<Descriptor>
    <ID>11</ID>
    <Name>Mild Language</Name>
    <Description>-        Mild references to profanity, sexuality, violence,
                        alcohol, or drug use</Description>
</Descriptor>
<Descriptor>
    <ID>12</ID>
    <Name>Mild Lyrics</Name>
    <Description>-        Mild references to profanity, sexuality, violence,
                        alcohol, or drug use in music</Description>
</Descriptor>
<Descriptor>
    <ID>13</ID>
    <Name>Mild Violence</Name>
    <Description>-        Mild scenes depicting characters in unsafe and/or
                        violent situations</Description>
</Descriptor>
<Descriptor>
    <ID>14</ID>
    <Name>Nudity</Name>
    <Description>-        Graphic or prolonged depictions of
                        nudity</Description>
</Descriptor>
<Descriptor>
    <ID>15</ID>
    <Name>Partial Nudity</Name>
    <Description>-        Brief and mild depictions of nudity</Description>
</Descriptor>
<Descriptor>
    <ID>16</ID>
    <Name>Some Adult Assistance May Be Needed</Name>
    <Description>-        Early Childhood Descriptor only</Description>
</Descriptor>
<Descriptor>
    <ID>17</ID>
    <Name>Strong Language</Name>
    <Description>-        Profanity and explicit references to sexuality,
                        violence, alcohol, or drug use</Description>
</Descriptor>
<Descriptor>
    <ID>18</ID>
    <Name>Strong Lyrics</Name>
    <Description>-        Profanity and explicit references to sex, violence,
                        alcohol, or drug use in music</Description>
</Descriptor>
<Descriptor>
    <ID>19</ID>
    <Name>Strong Sexual Content</Name>
    <Description>-        Graphic depiction of sexual behavior, possibly
                        including nudity</Description>
</Descriptor>
```

TABLE 2-continued

Example RDF File

```xml
            <Descriptor>
                <ID>20</ID>
                <Name>Suggestive Themes</Name>
                <Description>-          Mild provocative references or
                                        materials</Description>
            </Descriptor>
            <Descriptor>
                <ID>21</ID>
                <Name>Tobacco Reference</Name>
                <Description>-          Reference to and/or images of tobacco
                                        products</Description>
            </Descriptor>
            <Descriptor>
                <ID>22</ID>
                <Name>Use of Drugs</Name>
                <Description>-          The consumption or use of illegal
                                        drugs</Description>
            </Descriptor>
            <Descriptor>
                <ID>23</ID>
                <Name>Use of Alcohol</Name>
                <Description>-          The consumption of alcoholic
                                        beverages</Description>
            </Descriptor>
            <Descriptor>
                <ID>24</ID>
                <Name>Use of Tobacco</Name>
                <Description>-          The consumption of tobacco
                                        products</Description>
            </Descriptor>
            <Descriptor>
                <ID>25</ID>
                <Name>Violence</Name>
                <Description>-          Scenes involving aggressive conflict</Description>
            </Descriptor>
        </Descriptors>
    </Locale>
   </Locales>
</RatingSystem>
<RatingSystem>
    <RatingID>{36798944-B235-48ac-BF21-E25671F597EE}</RatingID>
    <Version>1.0.0.0000</Version>
    <DefaultLocales>
        <LocaleID>de</LocaleID>
    </DefaultLocales>
    <Locales>
        <Locale>
            <LocaleID>en</LocaleID>
            <SystemName>PEGI</SystemName>
            <SystemDescription>              Pan European Gaming
                                             Information</SystemDescription>
            <SystemWebAddress>http://www.pegi.info</SystemWebAddress>
            <LogoGraphicID>PEGI_logo.gif</LogoGraphicID>
            <Ratings>
                <rating>
                    <level>0</level>
                    <RatingName>18+</RatingName>
                    <RatingDescription>For ages 18 and higher</RatingDescription>
                    <GraphicID>PEGI_18.gif</GraphicID>
                </rating>
                <rating>
                    <level>1</level>
                    <RatingName>16+</RatingName>
                    <RatingDescription>For ages 16 and higher</RatingDescription>
                    <GraphicID>PEGI_16.gif</GraphicID>
                </rating>
                <rating>
                    <level>2</level>
                    <RatingName>12+</RatingName>
                    <RatingDescription>For ages 12 and higher</RatingDescription>
                    <GraphicID>PEGI_12.gif</GraphicID>
                </rating>
                <rating>
                    <level>3</level>
                    <RatingName>7+</RatingName>
                    <RatingDescription>For ages 7 and higher</RatingDescription>
                    <GraphicID>PEGI_7.gif</GraphicID>
                </rating>
```

TABLE 2-continued

Example RDF File

```
            <rating>
                <level>4</level>
                <RatingName>3+</RatingName>
                <RatingDescription>For ages 3 and higher</RatingDescription>
                <GraphicID>PEGI_3.gif</GraphicID>
            </rating>
        </Ratings>
        <Descriptors>
            <Descriptor>
                <ID>0</ID>
                <Name>Discrimination</Name>
                <Description>-       Game contains depictions of, or material which may
                                    encourage, discrimination</Description>
            </Descriptor>
            <Descriptor>
                <ID>1</ID>
                <Name>Drugs</Name>
                <Description>-       Game refers to or depicts the use of
                                    drugs</Description>
            </Descriptor>
            <Descriptor>
                <ID>2</ID>
                <Name>Fear</Name>
                <Description>-       Game may be frightening or scary for young
                                    children </Description>
            </Descriptor>
            <Descriptor>
                <ID>3</ID>
                <Name>Bad Language</Name>
                <Description>-       Game contains bad language</Description>
            </Descriptor>
            <Descriptor>
                <ID>4</ID>
                <Name>Sex</Name>
                <Description>-       Game depicts nudity and/or sexual behaviour or
                                    sexual references</Description>
            </Descriptor>
            <Descriptor>
                <ID>5</ID>
                <Name>Violence</Name>
                <Description>-       Game contains depictions of violence</Description>
            </Descriptor>
        </Descriptors>
    </Locale>
  </Locales>
 </RatingSystem>
/RatingsDefinitionFile>
```

Once the API 220 has obtained the ECDF file 205, the user setting file (not shown) from store 210 and the appropriate RDF file 225, the ECDF file 205 can be compared with the user settings file based on the rating definition file 225 to determine if a particular user will be allowed access 240 to the entertainment content. The API 220 will evaluate each user with parental controls applied in a similar fashion as that described above. If a user is blocked from playing the game, they may be added to the security group as described in the above example implementation. Accordingly, any members of the security group may be unable to access the game.

Example embodiments provide that when the aforementioned process evaluates that a user is not allowed access to a game, and it is the user who is trying to install the game, the installation will be denied. Alternatively, the game may be installed but access to the contents of the installed file will be denied. As previously mentioned, example embodiments provide for a lockdown on the whole file directory for the games such that the user is denied access to the executable file and any art or other files associated with the game directory.

The present invention is also applicable through the use of a network, which will allow a single point of parental control configuration for multiple points of user connection. The user's game content settings will automatically roam with him/her on the network. The system administrator can update the configuration settings for the limited users on any machine from within the network, assuming they have administrator credentials. When the user's game content settings are changed, they may take affect at his next session anywhere on the network. Example embodiments provide for automatic log-off of administered accounts when settings are changed on the local machine, or anywhere on the network.

Figure 3:
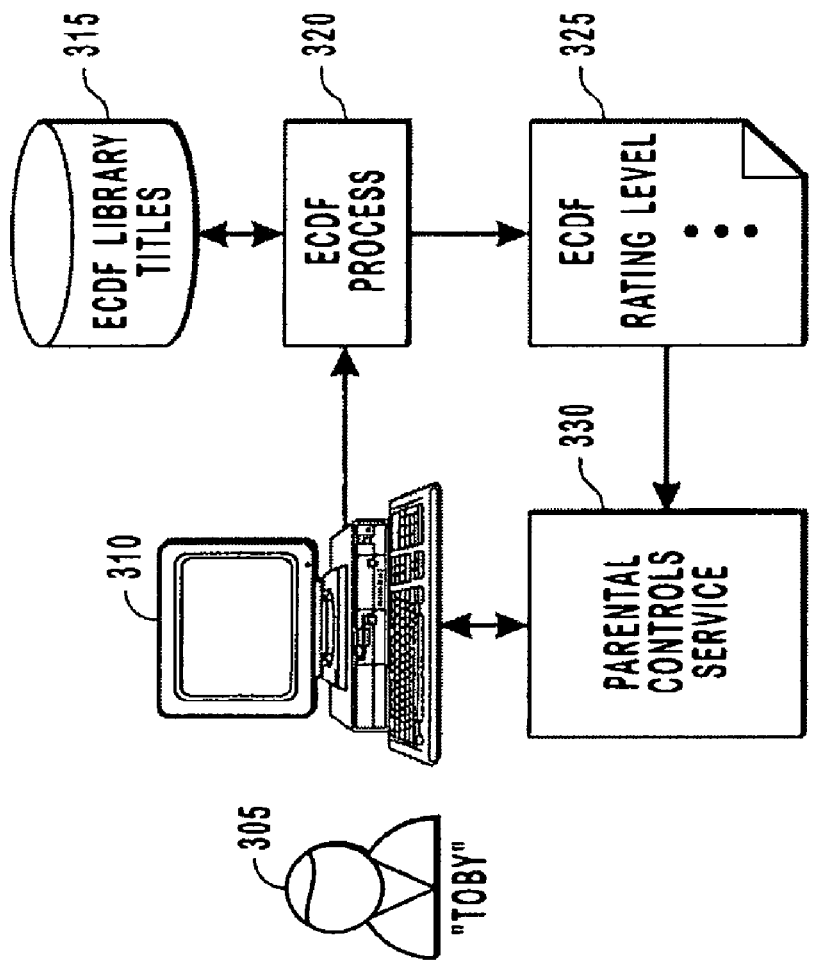
FIG. 3 illustrates an example embodiment of how the present invention can detect and process legacy games.

Example embodiments also provide for parental controls to be enabled for legacy games, i.e., known games that are distributed without ECDF files. FIG. 3 illustrates an example of the legacy game processing 300 in accordance with the present invention. A user Toby 305 may be able to install a legacy game onto computer 310 since the system typically will not recognize the game as subject to parental controls. When, however, Toby 305 goes to run the executable from the game, an ECDF process 320 detects that Toby 305 is attempting to run a program. Accordingly, the process 320 looks in the ECDF library 315 to determine if an ECDF file has been created for the corresponding title of the legacy game. The ECDF library 315 is simply a library created and updated for legacy programs of interest. The ECDF file may be identified by, e.g. the executable name, supporting title or any other information that will uniquely identify the game being executed. If process 320 determines that an ECDF file exists for the title of the legacy game the process 320 may write an ECDF file 325 defining the rating level and any content descriptors for the game. A parental control service 330 may then be notified of the ECDF file 325. Parental control service 330 may then run the aforementioned entertainment access evaluation 200 to determine if Toby 305 can access the legacy title. If it determined that Toby 305 does not have access, the executable may immediately be killed. In addition, a security group may be created for the particular legacy title and Toby will be added to the security group, thus denying him any future access to even the directory for the legacy title.

An example implementation of the ECDF process 320 used in determining and creating an ECDF file for a legacy game is as follows. When an executable is run, the operating system creates a new process/thread for the application. At this time, it is possible for the operation system to check/determine the name of the application being executed and check/determine if a match exists within ECDF library 315 for the name or other corresponding information. In one example, if a match exists, the name is written to a file. When the file is written, the operation system notifies parental control service 330, which reads the name of the executable out of the file and look up the appropriate ECDF file 325 for the legacy game. The parental control service 330 can then extract the rating and evaluate and install the appropriate controls.

The present invention also provides for an example embodiment that will run the above ECDF process 320 if access to the game library folder is open. Accordingly, if a user simply opens the game folder operating system can create a process/thread that may detect the opening of the folder and scan on all executables for an ECDF file match. In addition, a log can be created that goes to the administrator whenever an executable or a game folder is accessed to notify the administrator that access for these files is attempted.

In yet another exemplary embodiment, a logging or auditing system is provided such that executables ran by an individual user are recorded for the title and length of use for the particular executable. Accordingly, if a limited user is somehow able to override the system and run an unauthorized game, the parent may be notified via the auditing system that a particular executable has been run for numerous hours.

Further example embodiments provide for a request game access wherein a user can request permission from an administrator to play a particular game. If the administrator is logged onto the network, or at some other computer that can be accessed by the network, the administrator will receive the request and can log onto the network and enter a per-game permission for the particular user if she determines that the user can play the game.

In still yet another example embodiment, a feature is provided that may allow an administrator to prevent users (temporarily or indefinitely) from playing any games. For example, the system would allow an employer to prevent employees from playing games during office hours, or all together. Further, the system could also be used to "ground" a child—i.e., prevent them from playing games on the network or their personal computer.

The present invention may also be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particularly ordering or combination of the acts and/or steps.

FIG. 4 illustrates steps for controlling a user's access to entertainment content using dynamic data defined by rating definition file, entertainment content definition file and user permission settings. The rating definition file can be retrieved in step 405 from one or more rating definition files that dynamically define an entertainment rating scale. Further, an entertainment content definition file can be retrieved in step 410 that defines a content rating for entertainment content. User access settings can also be retrieved in step 415 that define a user's access rating for a particular user. Using the entertainment rating scale in step 420 a comparison can be made of the user access rating with the content rating for the entertainment content to determine if the particular user is allowed access to the entertainment content.

FIG. 5 illustrates example acts of controlling a user's access to entertainment content in accordance with example embodiments. A security group for the entertainment content may be created in act 505, and access for members of the security group may be denied in act 510. An entertainment content definition file is read in act 515 that defines the rating level and one or more content descriptors for the entertainment content. User access settings for a particular user are read in act 520 that define a rating level and one or more content descriptors for the user. Further, an updatable rating definition file is read in act 525 that defines a rating hierarchy and content descriptors for one or more levels within the rating hierarchy. Based on the hierarchy defined in the rating definition file, instructions are executed that compare the rating level and the content descriptors for the entertainment content to the rating level and content descriptors for the user in act 530 when determining if the user is authorized access to the entertainment content. In act 535, if the user is not authorized to access the entertainment content, the particular user is added as a member of the security group thereby denying the user access to the entertainment content because members of the security group are denied access.

FIG. 6 illustrates acts of a setup or configuration process and system for controlling users access to entertainment content in accordance with example embodiments. A ratings definition file that defines a rating hierarchy and content descriptors for one or more levels within the rating hierarchy for an entertainment content definition file and user access settings is selected in act 605. User access settings for a particular user are then selected in act 610. Within the user access settings, a rating level and one or more content descriptors may be specified in act 615 based on the selected ratings definition file in order to control content that can be accessed by the user. The user access settings may be stored in act 620 for later comparison with an entertainment content rating in determining if the user has access to the selected content.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 35, one or more application programs 36, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an entertainment system for playing entertainment content, a method of controlling a user's access to the entertainment content in a manner that allows rating systems to be changed, added, or removed, and by using dynamic data defined by a rating definition file, an entertainment content definition file, and user permission settings, the method comprising:

at an entertainment system, accessing a rating definition file, the accessed rating definition file dynamically defining an entertainment rating scale independent of any particular entertainment content, the rating definition file and the entertainment rating scale being independent of any particular rating system, the rating definition file data defining the entertainment rating scale being dynamically updateable to selectively perform each of adding, removing and changing rating levels and content descriptors within the entertainment rating scale, wherein the entertainment rating scale is defined independent of any particular entertainment content;

retrieving an entertainment content definition file that defines a content rating for entertainment content;

retrieving user access settings that define a user access rating for a particular user, the user access settings having been configured through a user interface (UI) enabling an administrator to configure entertainment content restrictions and permissions for a plurality of users such that different rating selections apply to different users;

using the entertainment rating scale dynamically defined by the rating definition file to compare the user access rating with the content rating for the entertainment content to determine if the particular user is allowed access to the entertainment content;

adding the particular user as a member of a security group associated with the entertainment content if the particular user is not authorized to access the entertainment content; and denying access to the entertainment content based upon the security group associated with the entertainment content.

2. The method of claim 1, wherein the rating definition file further dynamically defines one or more content descriptors for one or more rating levels within the entertainment rating scale, the rating levels within the entertainment rating scale are age-based rating levels and the content descriptors define the type of subject matter within each rating scale.

3. The method of claim 2, wherein entertainment content definition file further defines one or more content descriptors for the entertainment content and the user access settings further define user content descriptors that limit the type subject matter a user is allowed access to within the user access rating, and wherein using the entertainment rating scale dynamically defined by the rating definition file further includes:

using the one or more content descriptors dynamically defined by the rating definition file to compare the user content descriptors with the one or more content descriptors for the entertainment content definition file to determine if the particular user is allowed access to the entertainment content.

4. The method of claim 1, wherein the entertainment content is titled and a denial of access can be overridden by including the title of the entertainment content in the user access settings.

5. The method of claim 1, wherein if it is determined that the particular user is denied access to the entertainment content, the user is denied access to a directory in which the entertainment content is stored.

6. The method of claim 1, wherein the entertainment content is titled and, if it is determined that the user is allowed access to the entertainment content, the title and duration of access is recorded.

7. The method of claim 1, wherein the rating definition file retrieved is an XML file.

8. In an entertainment system for playing entertainment content, a computer-storage device for use in performing a method of controlling a user's access to the entertainment content in a manner that allows rating systems to be changed, added, or removed, and by using dynamic data defined by a rating definition file, an entertainment content definition file, and user permission settings to be performed in the entertainment system, the computer-storage device comprising:

one or more computer-readable storage media, the one or more computer-readable storage media including non-volatile storage devices and/or volatile memory, the computer-readable storage media having stored thereon computer-executable instructions, that, when executed by a processor, causes the entertainment system to perform a method that includes:

at the entertainment system, access a rating definition file, the rating definition file dynamically defining an entertainment rating scale independent of any particular entertainment content, the rating definition file and the entertainment rating scale being independent of any particular rating system, the rating definition file data defining the entertainment rating scale being dynamically updateable to selectively perform each of adding, removing and changing rating levels and content descriptors within the entertainment rating scale, wherein the entertainment rating scale is defined independent of any particular entertainment content;

retrieving an entertainment content definition file that defines a content rating for entertainment content;

retrieving user access settings that define a user access rating for a particular user, the user access settings having been configured through a user interface (UI) enabling an administrator to configure entertainment content restrictions and permissions for a plurality of users such that different rating selections apply to different users;

using the entertainment rating scale dynamically defined by the rating definition file to compare the user access rating with the content rating for the entertainment content to determine if the particular user is allowed access to the entertainment content;

adding the particular user as a member of a security group associated with the entertainment content if the particular user is not authorized to access the entertainment content; and denying access to the entertainment content based upon the security group associated with the entertainment content.

9. The computer storage device of claim 8, wherein the rating definition file further dynamically defines one or more content descriptors for one or more rating levels within the entertainment rating scale, the rating levels within the entertainment rating scale are age-based rating levels and the content descriptors define the type of subject matter within each rating scale.

10. The computer-storage device of claim 9, wherein entertainment content definition file further defines one or more content descriptors for the entertainment content and the user access settings further define user content descriptors that limit the type subject matter a user is allowed access to within the user access rating, and wherein using the entertainment rating scale dynamically defined by the rating definition file further includes:

using the one or more content descriptors dynamically defined by the rating definition file to compare the user content descriptors with the one or more content descriptors for the entertainment content definition file to determine if the particular user is allowed access to the entertainment content.

11. The computer-storage device of claim 8, wherein the entertainment content is titled and a denial of access can be overridden by including the title in the user access settings.

12. The computer-storage device of claim 8, wherein if it is determined that the particular user is denied access to the entertainment content, the user is denied access to a directory in which the entertainment content is stored.

13. The computer-storage device of claim 8, wherein the entertainment content is titled and, if it is determined that the user is allowed access to the entertainment content, the title and duration of access is recorded.

14. The computer-storage device of claim 8, wherein the rating definition file retrieved is an XML file.

15. In an entertainment system for playing entertainment content, a method of controlling a user's access to the entertainment content in a manner that allows rating systems to be changed, added, or removed, and by using dynamic data defined by a rating definition file, an entertainment content definition file, and user permission settings, the method comprising:

at an entertainment system, accessing a rating definition file, the rating definition file dynamically defining an entertainment rating scale independent of any particular entertainment content and by including one or more content descriptors for each level within the rating scale, the rating definition file and the entertainment rating scale being independent of any particular rating system, the rating definition file data defining the entertainment rating scale being dynamically updateable to selectively perform each of adding, removing and changing rating levels and content descriptors within the entertainment rating scale, wherein the entertainment rating scale is defined independent of any particular entertainment content;

retrieving an entertainment content definition file that defines a content rating and one or more content descriptors for entertainment content;

retrieving user access settings that define a user access rating and one or more content descriptors for a particular user, the user access settings having been configured through a user interface (UI) enabling an administrator to configure entertainment content restrictions and permissions for a plurality of users such that different rating selections apply to different users;

using the entertainment rating scale and one or more content descriptors for each level within the rating scale dynamically defined by the rating definition file to compare the user access rating and one or more content descriptors with the content rating and one or more content descriptors for the entertainment content to determine if the particular user is allowed access to the entertainment content;

adding the particular user as a member of a security group associated with the entertainment content if the particular user is not authorized to access the entertainment content; and denying access to the entertainment content based upon the security group associated with the entertainment content.

16. The method of claim 15, wherein the entertainment content is titled and a denial of access can be overridden by including the title in the user access settings.

17. The method of claim 15, wherein if it is determined that the particular user is denied access to the entertainment content, the user is denied access to a directory associated with the entertainment content.

18. The method of claim 15, wherein the rating definition file retrieved is an XML file.

19. The method of claim 15, wherein the one or more rating definition files define a rating hierarchy and the one or more content descriptors are for levels within the rating hierarchy, and wherein determining if the particular user is allowed access to the entertainment content includes executing instructions, based on the rating hierarchy defined in the one or more rating definition files that comparing the user access rating from the rating hierarchy with the one or more content descriptors, and when the particular user is not authorized to access the entertainment content, adding the particular user as a member of a security group, thereby denying the particular user access to the entertainment content because members of the security group are denied access to the entertainment content.

20. The method of claim 1, further comprising:

receiving an update to the rating definition file and, in response, updating the rating definition file, wherein updating the rating definition file includes removing a rating level for the entertainment rating scale, wherein using the entertainment rating scale dynamically defined by the rating definition file includes determining that the entertainment content definition file defines a content rating that does not exist in the updated rating definition file and, in response, determining whether the user can be granted access to the entertainment content according to rules defined for unrated content.

* * * * *